(12) United States Patent
Osentoski et al.

(10) Patent No.: US 6,435,545 B1
(45) Date of Patent: Aug. 20, 2002

(54) INFLATABLE CURTAIN WITH ANCHOR DEVICE

(75) Inventors: Thomas Osentoski, Marysville; John P. Wallner, Rochester Hills, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/730,132

(22) Filed: Dec. 5, 2000

(51) Int. Cl.[7] .............................................. B60R 21/22
(52) U.S. Cl. .................. 280/730.2; 280/743.2
(58) Field of Search .......................... 280/730.2, 730.1, 280/749, 753, 743.2; 60/635, 538; 188/371, 374

(56) References Cited

U.S. PATENT DOCUMENTS

| | | |
|---|---|---|
| 5,333,898 A | 8/1994 | Stutz |
| 5,358,275 A | * 10/1994 | Fohl .............................. 60/635 |
| 5,588,672 A | 12/1996 | Karlow et al. |
| 5,707,075 A | 1/1998 | Kraft et al. |
| 5,752,713 A | 5/1998 | Matsuura et al. |
| 5,788,270 A | 8/1998 | Haland et al. |
| 5,865,462 A | 2/1999 | Robins et al. |
| 5,924,722 A | 7/1999 | Koide et al. |

* cited by examiner

*Primary Examiner*—Peter C. English
(74) *Attorney, Agent, or Firm*—Tarolli, Sundheim, Covell, Tummino & Szabo L.L.P.

(57) ABSTRACT

An apparatus (10) for helping to protect an occupant of a vehicle (12) comprises an inflatable vehicle occupant protection device (14) inflatable away from a vehicle roof (18) between a vehicle side structure (16) and a vehicle occupant. The apparatus (10) further comprises an anchoring device (70) that comprises a track (72) and an element (74) that is slidable along the track. The track (72) is connected to the side structure (16) and has a wall (82, 200) comprising a smooth uninterrupted surface (94, 202). The element (74) is connected to the device (14) and has a surface (130, 242) that is in continuous engagement with the surface (94, 202) of the wall (82, 200). The device (14) applies a first force to the element (74) which causes the element to slide in a first direction along the track (72). The element (74) is urged to slide along the track (72) in a second direction, opposite the first direction, when a second force is applied to the element. The surface (130, 242) of the element (74) engages the surface (94, 202) of the wall (82, 200) to block the element from sliding in the second direction.

28 Claims, 4 Drawing Sheets

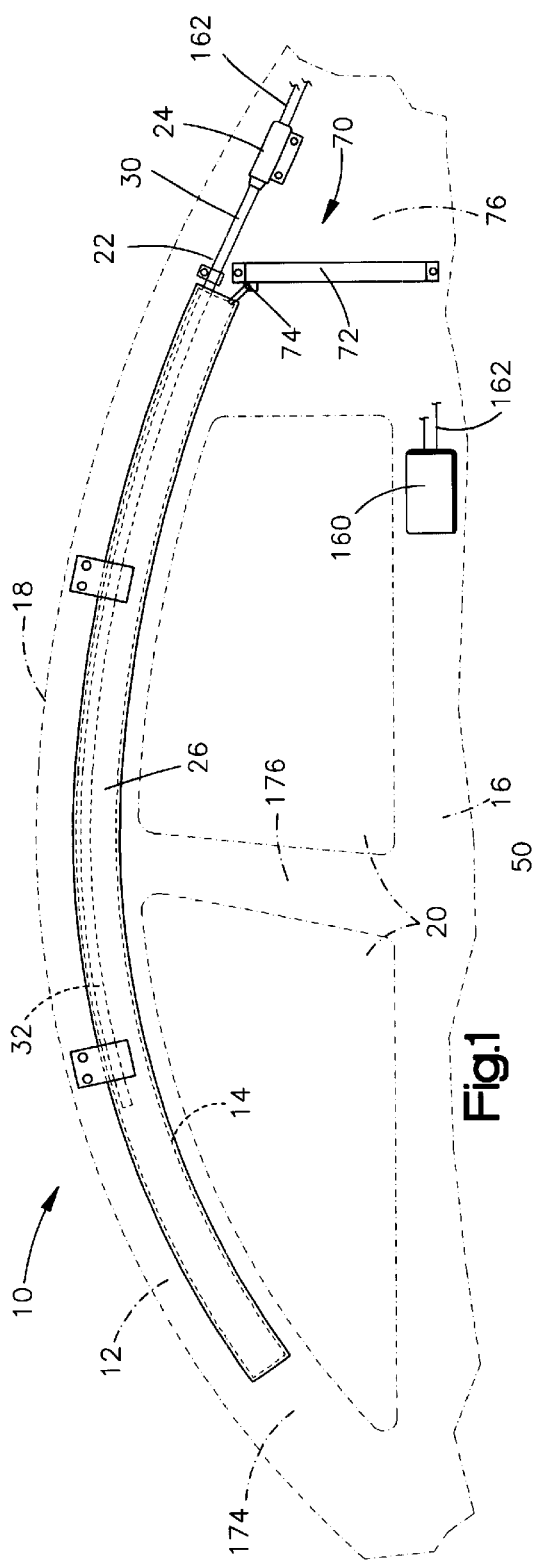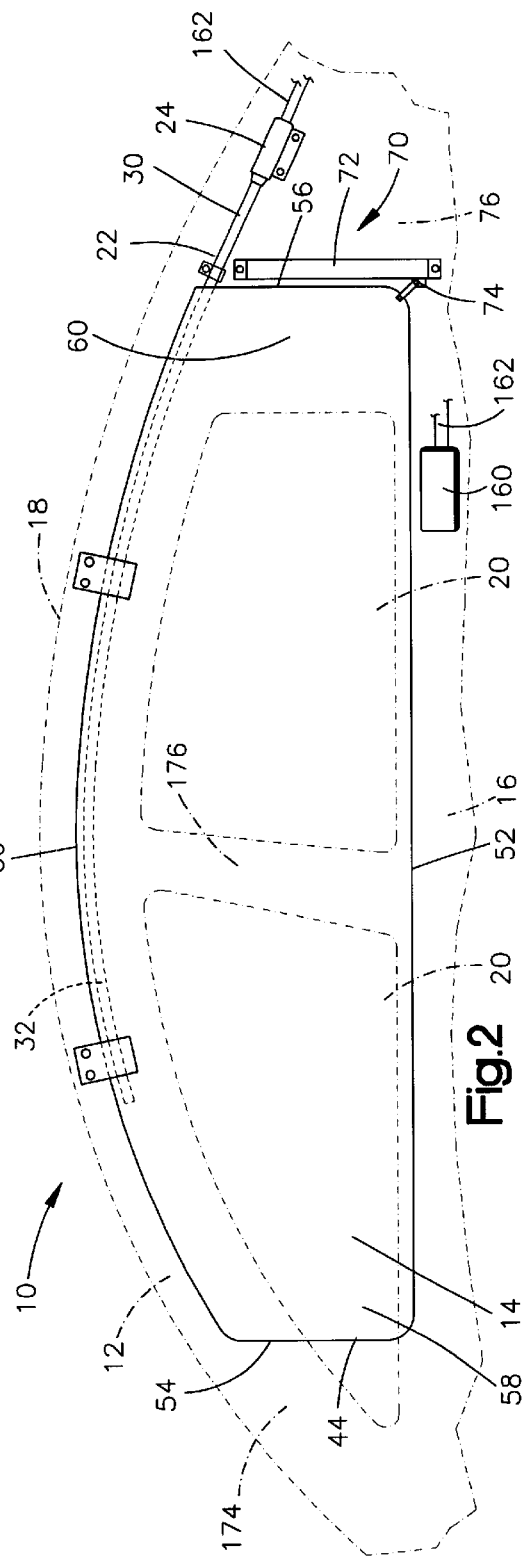

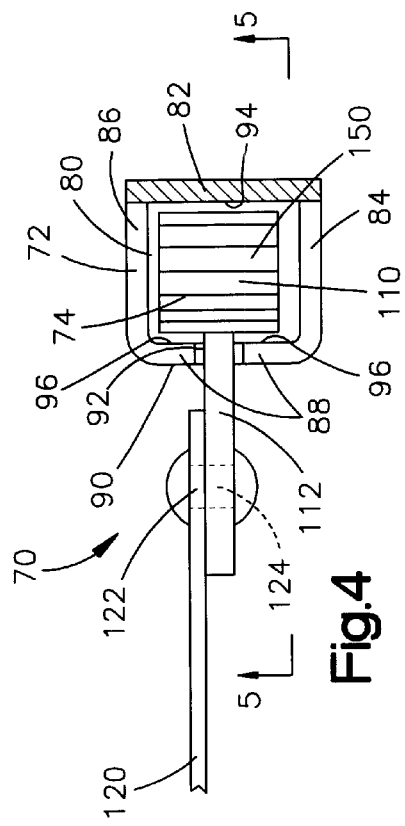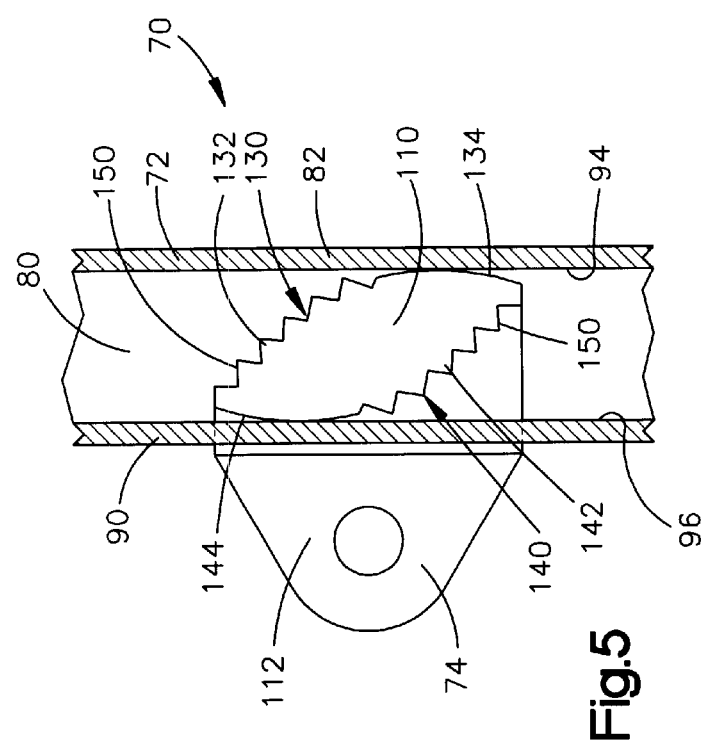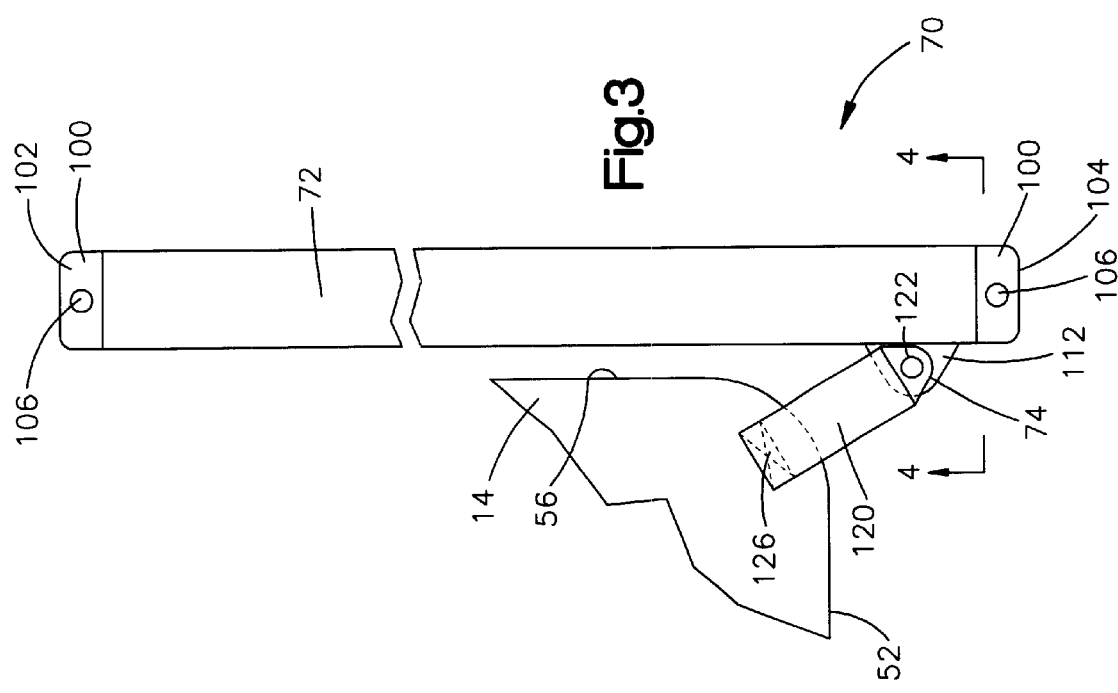

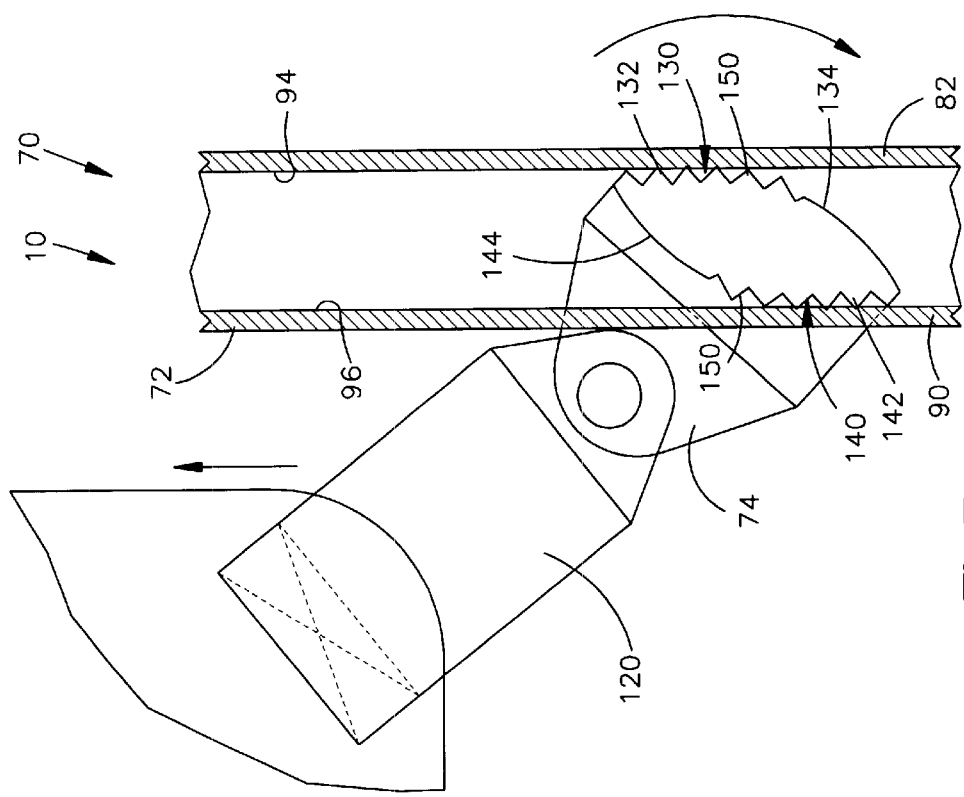
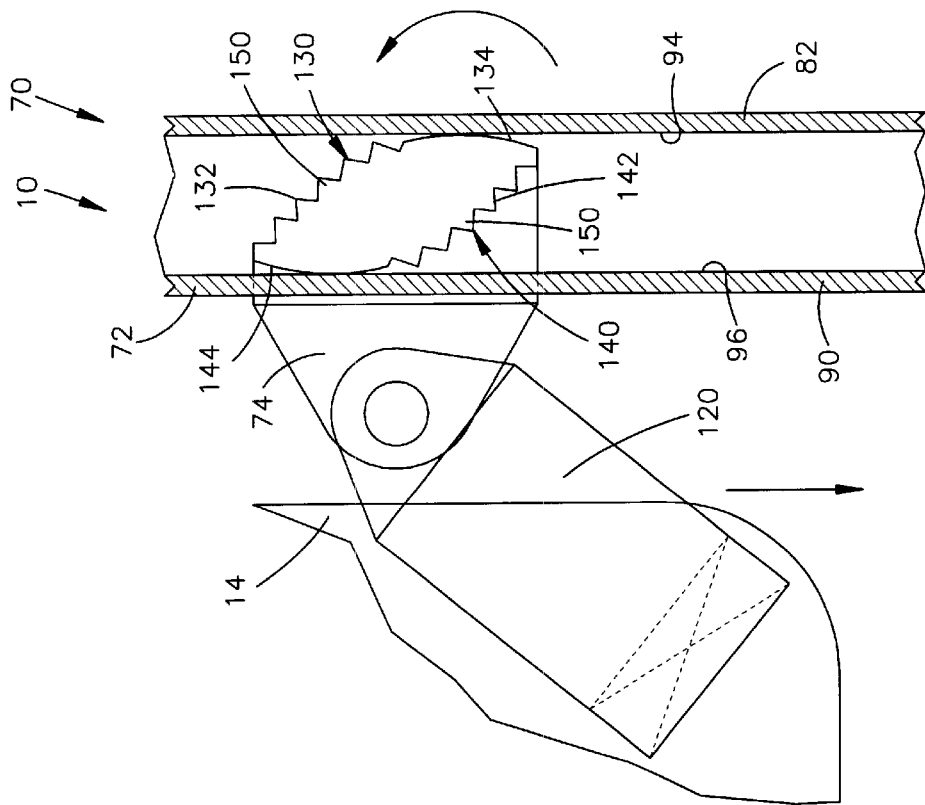

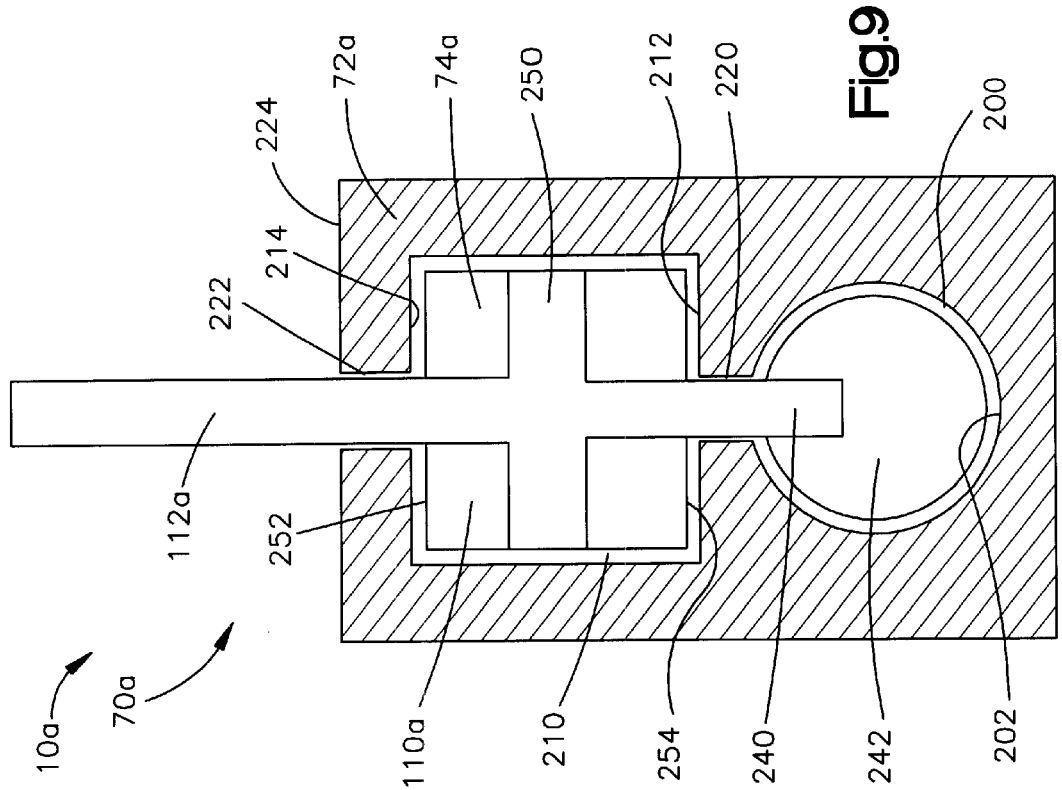
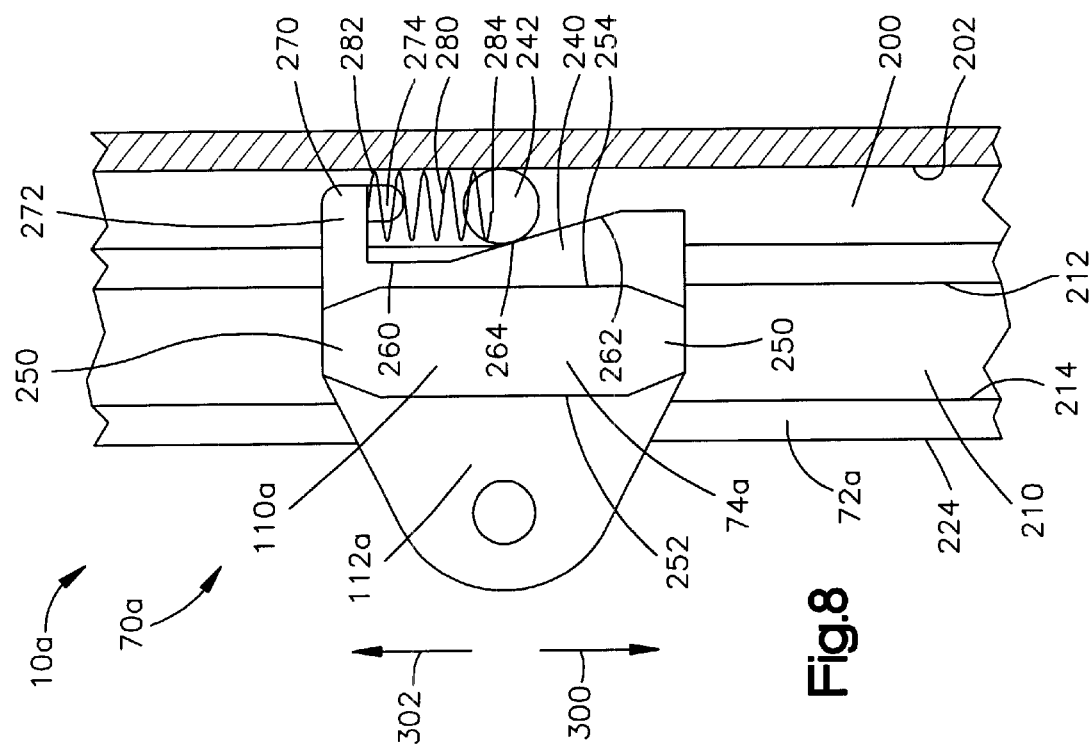

INFLATABLE CURTAIN WITH ANCHOR DEVICE

FIELD OF THE INVENTION

The present invention relates to an inflatable vehicle occupant protection device for helping to protect an occupant of a vehicle in the event of a side impact to the vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device. The inflatable vehicle occupant protection device is adapted to inflate away from the vehicle roof into a deployed position between the side structure of the vehicle and a vehicle occupant. An inflation fluid source provides inflation fluid for inflating the inflatable vehicle occupant protection device. The apparatus also includes an anchoring device.

The anchoring device comprises a track and an element that is slidable along the track. The track is connected to the vehicle side structure and has a wall comprising a smooth uninterrupted surface extending along the length of the track. The element is connected to the inflatable vehicle occupant protection device and has a surface that is in continuous engagement with the smooth uninterrupted surface of the wall.

The inflatable vehicle occupant protection device applies a first force to the element during inflation of the inflatable vehicle occupant protection device. The first force causes the element to slide in a first direction along the track. The element is urged to slide along the track in a second direction, opposite the first direction, when a second force is applied to the element. The surface of the element engages the smooth uninterrupted surface of the wall to block the element from sliding in the second direction along the track.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view depicting a deflated condition of an apparatus for helping to protect an occupant of a vehicle, according to a first embodiment of the present invention;

FIG. 2 is a schematic view of the apparatus of FIG. 1 in an inflated condition;

FIG. 3 is an enlarged view of a portion of the apparatus of FIG. 2;

FIG. 4 is an enlarged sectional view, taken generally along line 4—4 of FIG. 3, of a portion of the apparatus;

FIG. 5 is an enlarged sectional view, taken generally along line 5—5 of FIG. 4, of a portion of the apparatus;

FIG. 6 is an enlarged sectional view of a portion of the apparatus in a first condition;

FIG. 7 is an enlarged sectional view of a portion of the apparatus in a second condition;

FIG. 8 is an enlarged sectional view of a portion of an apparatus for helping to protect an occupant of a vehicle, according to a second embodiment of the present invention; and FIG. 9 is an enlarged sectional view of a portion of the apparatus of FIG. 8.

DESCRIPTION OF PREFERRED EMBODIMENTS

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24 and a second end portion 32 positioned in the inflatable curtain 14. The fill tube 22 has a plurality of openings (not shown) that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and the housing 26 have an elongated configuration and ex tend along the vehicle roof 18 and along the side structure 16 of the vehicle 12 above the side windows 20.

The inflatable curtain 14 preferably comprises overlying panels that are woven together along the perimeter 44 (FIG. 2) of the curtain to define an inflatable volume. The perimeter 44 is defined at least partially by an upper edge 50 of the inflatable curtain 14, an opposite lower edge 52 of the curtain, and front and rear edges 54 and 56, respectively, of the curtain that are spaced apart horizontally along the upper and lower edges.

The front and rear edges 54 and 56 of the inflatable curtain 14 partially define front and rear portions 58 and 60, respectively, that are spaced apart horizontally along the upper and lower edges 50 and 52 and extend between the upper and lower edges. In the embodiment illustrated in FIG. 2, the front and rear edges 54 and 56 extend between the upper and lower edges 50 and 52. The front and rear edges 54 and 56 could, however, be omitted and the upper and lower edges 50 and 52 extended until they intersect, in which case the front and rear portions 58 and 60 would be defined by the intersecting upper and lower edges.

Preferably, the inflatable curtain 14 is woven as a single piece of material to form the overlying panels. It will be recognized by those skilled in the art, however, that the inflatable curtain 14 could have alternative constructions. For example, the overlying panels could be formed from a sheet of material that is folded over and secured along a portion of the perimeter 44 by means such as stitching to form the inflatable curtain 14. The panels could also be formed from separate sheets of material arranged in an overlying manner and secured together by means such as stitching that extends around the entire perimeter 44 of the panels to form the inflatable curtain 14.

The inflatable curtain is constructed of a woven fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14, in which case the curtain may have a non-woven construction. The materials used to construct the inflatable curtain 14 may also be single or multi-layered materials.

The apparatus 10 (FIGS. 1 and 2) includes an anchoring device indicated generally at 70. The anchoring device 70 includes a track 72 and an element 74 that is slidable within the track 72. The track 72 is connected to the side structure 16 of the vehicle 12. As illustrated in FIGS. 1–2, the track 72 is connected to the side structure 16 on a C pillar 76 of the vehicle 12.

Referring now to FIGS. 3–5, the track 72 is generally elongated and tubular in construction. The track 72 may be constructed of any suitable material, such as metal or plastic, by known means such as machining, extrusion, and molding. The track 72 forms a channel 80 (FIGS. 4 and 5) that extends along the length of the track 72. The track 72 consists generally of a single elongated piece of material, such as metal, that is bent to form the generally tubular shape of the track. As best viewed in FIG. 4, the track 72 includes a first end wall 82, a first side wall 84 and a second side wall 86. Turned-in portions 88 extend from the first and second side walls 84 and 86 toward each other to form a second end wall 90 spaced opposite the first end wall 82. The second end wall 90 extends generally parallel to the first end wall 82. The first and second side walls 84 and 86 extend parallel to each other between the first and second end walls 82 and 90, from opposite ends of the end wall 82 to the turned-in portions 88. The turned-in portions 88 are spaced apart to form a slot 92 that extends along the length of the second end wall 90.

The first end wall 82 forms a smooth uninterrupted surface 94 that extends along the length of the track 72. The second end wall 90 forms a smooth uninterrupted surface 96 that extends along the length of the track 72 on both sides of the slot 92. By uninterrupted, it is meant that the surfaces 94 and 96 are generally free from apertures, indentations, dentations, or any other similar structural features that may block or help to block movement of the element 74 along the track 72.

The track 72 (FIG. 3) includes mounting flanges 100 that extend from the second side wall (not shown in FIG. 3) at first and second ends 102 and 104, respectively, of the track 72. Each mounting flange 100 includes a fastener aperture 106 for receiving a fastener (not shown), such as a bolt or screw, that fastens the track 72 to the side structure 16 (FIG. 2) of the vehicle 12. Those skilled in the art will recognize, however, that the mounting flanges 100 may comprise separate pieces, such as brackets, that are connected to the track 72. The track 72 is positioned on the side structure 16 such that the length of the track 72 extends in a generally vertical direction with respect to the direction of forward travel of the vehicle 12. The track 72 could, however, be positioned such that the length of the track extends at any desired angle relative to the vehicle 12.

The element 74 (FIGS. 4 and 5) includes a body portion 110 and a flange portion 112 that extends from the body portion. The body portion 110 is disposed in the channel 80 and the flange portion 112 extends from the channel through the slot 92. The outside dimensions of the body portion 110 of the element 74 are smaller than the inside dimensions of the channel 80. Thus, the element 74 is slidable within the channel 80 along the length of the track 72 and is also pivotable relative to the track.

The element 74 (FIGS. 3 and 4) is connected to the inflatable curtain 14 by a tether 120. The tether 120 has a first end 122 connected to the flange portion 112 of the element 74 by a rivet that extends through an aperture 124 in the flange portion. The tether 120 also has an opposite second end 126 (FIG. 3) connected to the inflatable curtain 14 at a location adjacent to or near the intersection of the lower edge 52 and the rear edge 56 of the curtain. It will be recognized by those skilled in the art, however, that the tether 120 may be connected to the inflatable curtain 14 at other locations on the curtain. Also, the tether 120 may be omitted altogether, in which case the inflatable curtain 14 would be connected directly to the flange portion 112 of the element 74.

As best illustrated in FIG. 5, the body portion 110 of the element 74 includes a first surface 130 presented toward the smooth uninterrupted surface 94 of the first end wall 82 and a second surface 140 presented toward the smooth uninterrupted surface 96 of the second end wall 90. The first surface 130 includes a first portion 132 and a second portion 134. The second surface 140 includes a first portion 142 and a second portion 144. The first portions 132 and 142 each include a plurality of projections, such as teeth 150 or other similar dentations. The second portions 134 and 144 are generally smooth.

The teeth 150 on the first portion 132 of the first surface 130 are positioned along a generally curved path extending from a position adjacent the first end wall 82 toward the second end wall 90. The teeth 150 on the first portion 142 of the second surface 140 are positioned along a generally curved path extending from a position adjacent the second end wall 90 toward the first end wall 82. In the embodiment illustrated in FIGS. 1–7, the second portions 134 and 144 of the first and second surfaces 130 and 140, respectively, have a slightly curved contour. The second portions 134 and 144 could, however, have a more curved contour or could be generally flat.

The vehicle 12 includes a sensor mechanism 160 (shown schematically in FIGS. 1 and 2) for sensing a side impact to the vehicle 12 and/or a rollover of the vehicle 12. The sensor mechanism 160 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 160 provides an electrical signal over lead wires 162 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 inflates away from the roof 18 in a downward direction as shown in the drawings and in a downward direction with respect to the direction of forward travel of the vehicle 12. The inflatable curtain 14 inflates to a deployed position illustrated in FIG. 2.

The inflatable curtain 14, when inflated, extends along the side structure 16 of the vehicle 12 and is positioned between the side structure and any occupant of the vehicle. The upper edge 50 (FIG. 2) is positioned adjacent to the intersection of the roof 18 and the side structure 16 of the vehicle 12. The front portion 58 is positioned adjacent to an A pillar 174 of the vehicle 12. The rear portion 60 of the inflatable curtain 14 is positioned adjacent to the C pillar 76 of the vehicle 12. The inflatable curtain 14 extends between the A pillar 174 and the C pillar 76 of the vehicle 12 and overlies at least a portion of the A pillar, C pillar, and a B pillar 176 of the vehicle.

It will be recognized by those skilled in the art that the apparatus 10 may have alternative configurations. For example, the anchoring device 70 may be connected to the vehicle side structure 16 at a location different than the C pillar 76, such as the A pillar 174 or the B pillar 176. As a further example, the inflatable curtain 14 could extend between the A pillar 174 and the B pillar 176 only, in which case the anchoring device 70 may be connected to the side structure 16 on the A pillar or the B pillar. Alternatively, the inflatable curtain 14 could extend between the B pillar 176 and the C pillar 76 only, in which case the anchoring device 70 may be connected to the side structure 16 on the B pillar or the C pillar. Also, in a vehicle having A, B, C, and D pillars (not shown), the inflatable curtain 14 could, when inflated, extend between the A pillar and the D pillar, in which case the anchoring device 70 may be connected to the side structure 16 on the A pillar or the D pillar.

The inflatable curtain 14, when inflated, helps to protect a vehicle occupant in the event of a vehicle rollover or a side impact to the vehicle 12. When inflated, the inflatable curtain 14 helps to absorb the energy of impacts with the curtain and helps to distribute the impact energy over a large area of the curtain.

Referring to FIG. 6, as the inflatable curtain 14 inflates, the curtain 14 applies a first force to the element 74 which pulls on the element 74 in a first direction via the tether 120. The first direction is indicated generally by the straight arrow in FIG. 6. The inflating curtain 14 causes the element 74 to slide along the track 72 in a first linear direction, generally parallel to the first direction, from the first end 102 (FIG. 3) towards the second end 104. The inflating curtain 14 (FIG. 6) also causes the element 74 to rotate in a first rotational direction, counterclockwise as viewed in FIG. 6. The first rotational direction is indicated generally by the curved arrow in FIG. 6.

When the element 74 rotates in the first rotational direction, the first portion 132 of the first surface 130 moves away from the first end wall 82 and the first portion 142 of the second surface 140 moves away from the second end wall 90. Consequently, the second portion 134 of the first surface 130 moves toward the first end wall 82 and the second portion 144 of the second surface 140 moves toward the second end wall 90. The second portions 134 and 144 are thus biased against the smooth uninterrupted surfaces 94 and 96 of the first and second end walls 82 and 90, respectively.

The second portions 134 and 144, being generally smooth, provide relatively little frictional resistance to impede the movement of the element 74 in the first linear direction. As the element 74 slides along the track 72 in the first linear direction, the second portions 134 and 144 slide along the smooth uninterrupted surfaces 94 and 96 of the first and second end walls 82 and 90.

Referring to FIG. 7, a second force may act on the inflatable curtain 14 to move the curtain in a direction different than the first direction. This may cause the curtain 14 to pull on the element 74 via the tether 120 in a direction opposite the first direction. The direction opposite the first direction is indicated generally by the straight arrow in FIG. 7. The curtain 14, pulling on the element 74 in the direction opposite the first direction, would urge the element 74 to slide along the track 72 in a second linear direction, opposite the first linear direction. This would also cause the element 74 to rotate in a second rotational direction, clockwise as viewed in FIG. 7. The second rotational direction is indicated generally by the curved arrow in FIG. 7.

When the element 74 rotates in the second rotational direction, the first portion 132 of the first surface 130 moves towards the first end wall 82 and the first portion 142 of the second surface 140 moves towards the second end wall 90. consequently, the second portion 134 of the first surface 130 moves away from the first end wall 82 and the second portion 144 of the second surface 140 moves away from the second end wall 90. The first portions 132 and 142 are thus biased against the smooth uninterrupted surfaces 94 and 96 of the first and second end walls 82 and 90, respectively. The teeth 150 on the first portions 132 and 142 frictionally engage the smooth uninterrupted surfaces 94 and 96 of the first and second end walls 82 and 90 to help block movement of the element 74 in the second linear direction.

Preferably, as the element 74 is pulled in the second linear direction, the teeth 150 "dig into" the smooth uninterrupted surfaces 94 and 96 of the first and second end walls 82 and 90, causing material deformation in the material used to construct the track 72. This material deformation helps to increase the friction between the first surfaces 132 and 142 and the first and second end walls 82 and 90, respectively, and thus helps to block movement of the element 74 in the second linear direction.

Those skilled in the art will recognize that, since the teeth 150 cause material deformation of the first and second end walls 82 and 90, the materials selected to construct the element 74 and the track 72 may affect the operation of the anchor device 70. For example, the track 72 may be constructed of a metal, in which case the element 74 may be constructed of a metal or other material having a hardness greater than that of metal used to construct the track. As an alternative construction, the track 72 may be constructed of an elastomer or may be constructed of a metal with an elastomeric coating. In either of the aforementioned cases, the ability of the teeth 150 to deform the track material would be increased.

The element 74 is thus permitted to slide relatively easily along the track 72 in the first linear direction and is blocked from sliding along the track in the second linear direction. The element 74 is blocked against movement in the second linear direction at the farthest position the element reaches along the track 72 in the first linear direction. In other words, the element 74 is blocked from moving in the second linear direction at the farthest position from the first end 102 of the track that the element reaches.

In the inflated condition of the curtain 14, the anchoring device 70 helps maintain the position of the curtain between any occupant of the vehicle 12 and the side structure 16 of the vehicle 12 throughout the duration of the vehicle collision and/or rollover. The anchoring device 70 also helps to limit movement of the inflatable curtain 14 in a direction opposite the first direction.

A second embodiment of the present invention is illustrated in FIGS. 8 and 9. The second embodiment of the invention is similar to the first embodiment of the invention illustrated in FIGS. 1–7. Accordingly, numerals similar to those of FIGS. 1–7 will be utilized in FIGS. 8 and 9 to identify similar components, the suffix letter "a" being associated with the numerals of FIGS. 8 and 9 to avoid confusion. The apparatus 10a (FIGS. 8 and 9) of the second embodiment is identical to the apparatus 10 (FIGS. 1–7), except that the anchoring device 70a (FIGS. 8 and 9) of the second embodiment has a different configuration than the anchoring device 70 (FIGS. 1–7) of the first embodiment.

Referring now to FIGS. 8 and 9, the track 72a has a generally rectangular cross-section. The track 72a includes a cylindrical channel 200 that forms a smooth uninterrupted surface 202 extending along the length of the track. The track 72a also includes a rectangular channel 210 that extends parallel to the cylindrical channel 200 along the length of the track. The rectangular channel 210 is partially defined by a first side wall 212 and an opposite second side wall 214.

A first slot 220 extends from the smooth uninterrupted surface 202 of the cylindrical channel 200 to the first side wall 212 of the rectangular channel 210. The first slot 220 extends along the length of the track 72a. A second slot 222 extends from the second side wall 214 to an outer surface 224 of the track 72a. The second slot 222 also extends along the length of the track 72a.

The element 74a includes a body portion 110a, a flange portion 112a, a ramp 240 and a spherical member 242, such as a ball bearing. The body portion 110a is disposed in the rectangular channel 210. The body portion 110a has a generally rectangular cross-section with dimensions that provide a clearance fit with the rectangular channel 210. The body portion 110a is thus capable of sliding along the rectangular channel 210. As illustrated in FIG. 8, the body portion 110a may include tapered end portions 250 that help guide the body portion and prevent the body portion from binding-up or getting jammed in the rectangular channel 210.

The flange portion 112a extends perpendicularly from a first surface 252 of the body portion 110a through the second slot 222. The ramp 240 extends perpendicularly from a second surface 254 of the body portion 110a, opposite the first surface 252, through the first slot 220. The spherical member 242 has a diameter that is smaller than the diameter of the cylindrical channel 200. Preferably, the diameter of the spherical member 242 is only slightly smaller than the cylindrical channel 200. This provides a clearance fit between the cylindrical channel 200 and the spherical member 242. Thus, the spherical member 242 may slide or roll along the cylindrical channel 200.

As illustrated in FIG. 8, the ramp 240 has a first end 260 and an opposite second end 262. The first end 260 is positioned outside the cylindrical channel 200, in the first slot 220. The second end 262 is disposed in the cylindrical channel 200. A central portion 264 of the ramp 240 extends at an acute angle between the first and second ends 260 and 262. A retainer arm 270 includes a support portion 272 that extends generally perpendicularly from the first end 260 of the ramp 240. A pin portion 274 of the retainer arm 270 extends in a perpendicular direction from the end of the support portion 272 opposite the ramp 240 towards the second end 262 of the ramp.

The second end 262 of the ramp 240 extends into the cylindrical channel 200 a distance such that the spherical member 242 is blocked from moving past the second end. The retainer arm 270 also extends into the cylindrical channel 200 a distance such that the spherical member 242 is blocked from moving past the retainer arm. The spherical member 242 is thus retained between the retainer arm 270 and the second end 262 of the ramp.

The spherical member 242 is positioned in the cylindrical channel 200 adjacent the ramp 240. The spherical member 242 is biased away from the retainer arm 270 and into engagement with the cylindrical channel 200 and the ramp 240 by a biasing member, such as a spring 280. The spring 280 has a first end 282 that slides over the pin portion 274 of the retainer arm 270 and an opposite second end 284 that engages the spherical member 242. Preferably, the length of the spring 280 is such that the spring is maintained in a compressed condition and, thus, the spherical member 242 is maintained in continuous engagement with the smooth uninterrupted surface 202 of the cylindrical channel 200 and the ramp 240.

When a first force acts on the element 74a, the element is pulled in a first direction, indicated generally by the arrow labeled 300 in FIG. 8. When the element 74a is pulled in the first direction, the body portion 110a slides along the rectangular channel 210 in the first direction. The first and second surfaces 252 and 254 of the body portion slide along the second and first side walls 214 and 212, respectively, of the rectangular channel 210.

The spring 280 maintains the spherical member 242 in continuous engagement with the ramp 240 and the smooth uninterrupted surface 202 of the cylindrical channel 200. As the element 74a slides along the track 72a in the first direction, the spring 280 pushes the spherical member 242 in the first direction along the cylindrical channel 200. The amount of friction between the spherical member 242 and the smooth uninterrupted surface 202 of the cylindrical channel 200 is not great enough to overcome the first force. Thus, the element 74a is permitted to slide in the first direction along the track 72a.

When a second force acts on the element 74a, the element is pulled in a second direction, indicated generally by the arrow labeled 302 in FIG. 8. When the element 74a is pulled in the second direction, the body portion 110a slides along the rectangular channel 210 in the second direction. The first and second surfaces 252 and 254 of the body portion slide along the first and second side walls 212 and 214 of the rectangular channel 210.

When the element 74a slides in the second direction, the second end 262 of the ramp 240 is urged towards the spherical member 242. The spring 280 urges the spherical member 242 towards the second end 262 of the ramp 242. As the second end 262 of the ramp 240 and the spherical member 242 are urged towards each other, the spherical member 242 thus becomes jammed between the ramp 240 and the smooth uninterrupted surface 202 of the cylindrical channel 200. Thus, the amount of friction between the spherical member 242 and the smooth uninterrupted surface 202 of the cylindrical channel 200 increases. This blocks movement of the element 74a in the second direction along the track 72a.

The element 74a is thus permitted to slide relatively easily along the track 72a in the first direction and is blocked from sliding along the track in the second direction. The element 74a is blocked against movement in the second direction at the farthest position the element reaches along the track 72a in the first direction.

When the inflatable curtain (not shown in FIGS. 8 and 9) is in the inflated condition, the anchoring device 70a helps maintain the position of the curtain between any occupant of the vehicle and the side structure of the vehicle throughout the duration of the vehicle collision and/or rollover. The anchoring device 70a also helps to limit movement of the inflatable curtain in a direction opposite the first direction.

Advantageously, the biasing force produced by the spring 280 is of a magnitude sufficient to maintain the spherical member 242 positioned against the ramp 240 and the smooth uninterrupted surface 202 of the cylindrical channel 200, regardless of the physical orientation of the element 74a. For example, if the element 74a is oriented such that gravity urges the spherical member 242 in the second direction, the spring 280 would bias the spherical member against the ramp 240 and the smooth uninterrupted surface 202. This helps to ensure that the spherical member 242 will help block movement of the element 74a in the second direction regardless of the physical orientation of the element.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

an inflatable vehicle occupant protection device adapted to inflate away from the vehicle roof into a deployed position between the side structure of the vehicle and a vehicle occupant;

an inflation fluid source for providing inflation fluid for inflating said inflatable vehicle occupant protection device; and an anchoring device comprising:

a track adapted to be connected to the vehicle side structure, said track defining a channel having a wall comprising a smooth uninterrupted surface extending along the length of said track, said track further including a slot extending from said wall to an outer surface of said track along the length of said track; and an element that is slidable along said track, said element having a body portion positioned in said channel, said body portion having a surface in continuous engagement with said smooth uninterrupted surface of said wall, said element having a flange portion extending from said body portion through said slot, said flange portion being connected to said inflatable vehicle occupant protection device, said inflatable vehicle occupant protection device applying a first force to said element during inflation of said inflatable vehicle occupant protection device, said first force causing said element to slide in a first direction along said track, said element being urged to slide along said track in a second direction, opposite said first direction, when a second force is applied to said element, said surface of said body portion engaging said smooth uninterrupted surface of said wall to block said element from sliding in said second direction along said track, said first force causing said element to pivot in a first rotational direction relative to said track, said surface of said body portion including at least one first portion that moves away from said wall when said element rotates in said first rotational direction, said element pivoting in a second rotational direction, opposite said first rotational direction when said second force is applied to said element, said at least one first portion moving toward said wall and frictionally engaging said smooth uninterrupted surface of said wall when said element rotates in said second rotational direction, said at least one first portion blocking movement of said element in said second direction along said track.

2. Apparatus as defined in claim 1, wherein said at least one first portion of said surface frictionally engages said smooth uninterrupted surface of said wall and blocks movement of said element along said track when said second force is applied to said element and said element rotates in said second rotational direction.

3. Apparatus as defined in claim 2, wherein said first portion of said surface includes a plurality of teeth.

4. Apparatus as defined in claim 2, wherein said surface includes a second portion that moves toward said wall and engages said smooth uninterrupted surface of said wall when said element. rotates in said first rotational direction, said second portion providing low frictional resistance to said element sliding along said smooth uninterrupted surface of said wall in said first direction.

5. Apparatus as defined in claim 4, wherein said second portion is generally smooth.

6. Apparatus for helping to protect an occupant of a vehicle that has a side structure and a roof, said apparatus comprising:

an inflatable vehicle occupant protection device adapted to inflate away from the vehicle roof into a deployed position between the side structure of the vehicle and a vehicle occupant;

an inflation fluid source for providing inflation fluid for inflating said inflatable vehicle occupant protection device; and an anchoring device comprising:

a track adapted to be connected to the vehicle side structure, said track defining a channel having a wall comprising a smooth uninterrupted surface extending along the length of said track, said track further including a slot extending from said wall to an outer surface of said track along the length of said track; and an element that is slidable along said track, said element having a body portion positioned in said channel and a flange portion extending from said body portion through said slot, said flange portion being connected to said inflatable vehicle occupant protection device, said body portion including a spherical member having a surface in continuous engagement with said smooth uninterrupted surface of said wall, said spherical member being positioned between said wall and a ramp of said body portion, said spherical member being capable of movement along said track, said inflatable vehicle occupant protection device applying a first force to said element during inflation of said inflatable vehicle occupant protection device, said first force causing said element to slide in a first direction along said track, said element being urged to slide along said track in a second direction, opposite said first direction, when a second force is applied to said element, said surface of said spherical member engaging said smooth uninterrupted surface of said wall to block said element from sliding in said second direction along said track, said channel comprises a cylindrical portion and a non-cylindrical portion extending adjacent and parallel to each other along the length of said track, said non-cylindrical portion receiving a base portion of said body portion, said cylindrical portion receiving said spherical member, said channel including a slot that extends from said cylindrical portion to said non-cylindrical portion along the length of said channel, said ramp extending from said base portion through said slot of said channel and engaging said spherical member in said cylindrical portion, said spherical member being movable in said cylindrical portion along the length of said track.

7. Apparatus as defined in claim 6, wherein said spherical member has a diameter, said ramp having a first end spaced away from said wall a distance greater than the diameter of said spherical member and an opposite second end spaced away from said wall a distance less than the diameter of said spherical member.

8. Apparatus as defined in claim 7, wherein said element further comprises a biasing member that biases said spherical member away from said first end of said ramp towards said second end of said ramp to maintain said spherical member in continuous engagement with said ramp and said smooth uninterrupted surface of said wall, said spherical member becoming jammed between said ramp and said wall and frictionally engaging said smooth uninterrupted surface of said wall when said element is urged to slide along said track in said second direction by said second force, said spherical member blocking movement of said element along said track in said second direction.

9. Apparatus as defined in claim 8, wherein said biasing member comprises a spring.

10. Apparatus for helping to protect an occupant of a vehicle that has a side structure and a roof, said apparatus comprising:

an inflatable vehicle occupant protection device adapted to inflate away from the vehicle roof into a deployed position between the side structure of the vehicle and a vehicle occupant;

an inflation fluid source for providing inflation fluid for inflating said inflatable vehicle occupant protection device; and an anchoring device comprising:

a track adapted to be connected to the vehicle side structure; and an element that is slidable along said track, said element being connected to said inflatable vehicle occupant protection device, said inflatable vehicle occupant protection device applying a force to said element in a first direction during inflation of said inflatable vehicle occupant protection device, said force causing said element to pivot in a first rotational direction relative to said track and to slide along said track in a first linear direction, said element including at least one first portion that moves away from said track when said element rotates in said first rotational direction, said element pivoting in a second rotational direction, opposite said first rotational direction when a force is applied to said element in a second direction different than said first direction, said at least one first portion moving toward said track and frictionally engaging said track when said element rotates in said second rotational direction, said at least one first portion blocking movement of said element along said track in a second linear direction, opposite said first linear direction.

11. Apparatus as defined in claim 10, wherein said element helps to maintain said inflatable vehicle occupant protection device in said deployed position when said inflatable vehicle occupant protection device is inflated.

12. Apparatus as defined in claim 11, wherein said vehicle occupant protection device is an inflatable curtain having a stored position extending along the side structure adjacent the roof of the vehicle.

13. Apparatus as defined in claim 12, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

14. Apparatus as defined in claim 12, wherein said inflatable curtain when inflated has an upper edge positioned adjacent to the vehicle roof, an opposite lower edge, and front and rear edges spaced apart horizontally along said upper and lower edges, said element being connected to said inflatable curtain at a position adjacent said lower edge.

15. Apparatus as defined in claim 14, wherein said element is connected to said inflatable curtain adjacent the intersection of said lower edge and said rear edge of said inflatable curtain.

16. Apparatus as defined in claim 12, wherein a tether connects said element to said inflatable curtain.

17. Apparatus as defined in claim 12, wherein said track is connected to the side structure of the vehicle at a location on or near a pillar of the vehicle.

18. Apparatus as defined in claim 17, wherein said pillar is a C pillar of the vehicle.

19. Apparatus as defined in claim 12, further including a sensor for sensing a predetermined vehicle condition and providing a signal in response to said predetermined vehicle condition that causes said inflation fluid source to provide said inflation fluid to inflate said inflatable curtain.

20. Apparatus as defined in claim 19, wherein said predetermined vehicle condition is one of a side impact and a vehicle rollover.

21. Apparatus as defined in claim 10, wherein said at least one first portion of said element frictionally engages a smooth uninterrupted surface of said track and blocks movement of said element along said track when said force is applied to said element in said second direction and said element rotates in said second rotational direction.

22. Apparatus as defined in claim 10, wherein said at least one first portion of said element includes a plurality of teeth.

23. Apparatus as defined in claim 10, wherein said element includes a second portion that moves toward said track and engages a smooth uninterrupted surface of said track when said element rotates in said first rotational direction, said second portion providing low frictional resistance to said element sliding along said smooth uninterrupted surface of said track in said first direction.

24. Apparatus as defined in claim 23, wherein said second portion is generally smooth.

25. Apparatus for helping to protect an occupant of a vehicle that has a side structure and a roof, said apparatus comprising:

an inflatable vehicle occupant protection device adapted to inflate away from the vehicle roof into a deployed position between the side structure of the vehicle and a vehicle occupant;

an inflation fluid source for providing inflation fluid for inflating said inflatable vehicle occupant protection device; and an anchoring device comprising:

a track adapted to be connected to the vehicle side structure, said track defining a channel having a wall comprising a smooth uninterrupted surface extending along the length of said track, said channel comprising a cylindrical portion and a non-cylindrical portion extending adjacent and parallel to each other, said channel further comprising a slot extending between said cylindrical portion and said non-cylindrical portion; and an element that is slidable along said track, said element being connected to said inflatable vehicle occupant protection device, said element comprising a body portion disposed in said channel, said body portion including a base portion disposed in said non-cylindrical portion, a ramp extending from said base portion through said slot into said cylindrical portion, and a spherical member disposed in said cylindrical portion between said ramp and said smooth uninterrupted surface of said wall, said inflatable vehicle occupant protection device applying a first force to said element during inflation of said inflatable vehicle occupant protection device, said first force causing said element to slide in a first direction along said track, said element being urged to slide along said track in a second direction, opposite said first direction, when a second force is applied to said element, said spherical member being jammed between said ramp and said smooth uninterrupted surface of said wall to block said element from sliding in said second direction along said track.

26. Apparatus as defined in claim 25, wherein said spherical member has a diameter, said ramp having a first end spaced away from said wall a distance greater than the diameter of said spherical member and an opposite second end spaced away from said wall a distance less than the diameter of said spherical member.

27. Apparatus as defined in claim 26, wherein said element further comprises a biasing member that biases said spherical member away from said first end of said ramp towards said second end of said ramp to maintain said spherical member in continuous engagement with said ramp and said smooth uninterrupted surface of said wall, said spherical member becoming jammed between said ramp and said wall and frictionally engaging said smooth uninterrupted surface of said wall when said element is urged to slide along said track in said second direction by said second force, said spherical member blocking movement of said element along said track in said second direction.

28. Apparatus as defined in claim 27, wherein said biasing member comprises a spring.

* * * * *